United States Patent
Hopper et al.

(10) Patent No.: US 9,022,596 B2
(45) Date of Patent: May 5, 2015

(54) LIGHTING ARRANGEMENT COMPRISING ELONGATE LIGHT EMITTING MEMBERS

(75) Inventors: Nicholas John Hopper, High Wycombe (GB); Anthony Francis Cull, High Wycombe (GB)

(73) Assignee: VKR Holding A/S, Horsholm (DK)

(*) Notice: Subject to any disclaimer, the term of this patent is extended or adjusted under 35 U.S.C. 154(b) by 362 days.

(21) Appl. No.: 13/810,500

(22) PCT Filed: Jul. 18, 2011

(86) PCT No.: PCT/GB2011/001071
§ 371 (c)(1),
(2), (4) Date: Mar. 25, 2013

(87) PCT Pub. No.: WO2012/010824
PCT Pub. Date: Jan. 26, 2012

(65) Prior Publication Data
US 2013/0208463 A1 Aug. 15, 2013

(30) Foreign Application Priority Data
Jul. 19, 2010 (GB) .................................. 1012112.7

(51) Int. Cl.
| | |
|---|---|
| F21V 33/00 | (2006.01) |
| F24F 7/02 | (2006.01) |
| F24F 13/078 | (2006.01) |
| F21S 9/03 | (2006.01) |
| F21V 8/00 | (2006.01) |
| F21Y 101/02 | (2006.01) |
| F21Y 103/00 | (2006.01) |

(52) U.S. Cl.
CPC ............... *F21V 33/0088* (2013.01); *F24F 7/02* (2013.01); *F24F 13/078* (2013.01); *G02B 6/001* (2013.01); *G02B 6/0041* (2013.01); *F21V 33/006* (2013.01); *F21S 9/037* (2013.01); *F21Y 2101/02* (2013.01); *F21Y 2103/00* (2013.01)

(58) Field of Classification Search
CPC ... F21V 33/0088; F21V 33/006; G02B 6/001; F21S 9/037
USPC ...................... 362/218, 219, 225; 454/13, 900
See application file for complete search history.

(56) References Cited

U.S. PATENT DOCUMENTS

| 5,716,442 A | 2/1998 | Fertig |
| 6,093,098 A * | 7/2000 | Wilhelmson .................. 454/365 |
| 2006/0007549 A1 | 1/2006 | Zincone |

(Continued)

FOREIGN PATENT DOCUMENTS

| DE | 202010004479 U1 | 8/2010 |
| WO | 2006040572 A1 | 4/2006 |

OTHER PUBLICATIONS

International Patent Application No. PCT/GB2011/001071, International Search Report and Written Opinion mailed Oct. 5, 2011 (12 pages).

*Primary Examiner* — Karabi Guharay
(74) *Attorney, Agent, or Firm* — Dean W. Russell; Kilpatrick Townsend & Stockton LLP

(57) ABSTRACT

A lighting arrangement is provided on each corner of the housing of a ventilation arrangement. Each lighting arrangement comprises a profiled rod of acrylic material with a plurality of LED's shining downwardly into an upper end of the rod, with light being reflected outwardly, and particularly by bubbles within the rod. A reflective plate is provided at a lower end of the rod to reflect light back up the rod.

20 Claims, 3 Drawing Sheets

(56) References Cited

U.S. PATENT DOCUMENTS

2007/0110378 A1 5/2007 Zarian
2008/0207108 A1* 8/2008 Moller et al. .................. 454/199
2013/0063669 A1* 3/2013 Mouri ........................... 348/739

* cited by examiner

LIGHTING ARRANGEMENT COMPRISING ELONGATE LIGHT EMITTING MEMBERS

CROSS REFERENCE TO RELATED APPLICATIONS

This application is the U.S. national phase of International Application No. PCT/GB2011/001071 filed on Jul. 18, 2011, and published in English on Jan. 26, 2012 as International Publication No. WO 2012/010824 A1, which application claims priority to Great Britain Patent Application No. 1012112.7 filed on Jul. 19, 2010, the contents of both of which are incorporated herein by reference.

This invention concerns a lighting arrangement, and particularly but not exclusively a lighting arrangement for a ventilation arrangement, and particularly a ventilation arrangement locatable on the roof of a building.

It is becoming increasingly common to provide ventilation arrangements on the roofs of buildings, and especially arrangements which use natural ventilation.

One such arrangement includes a duct extending from just above roof level into a building, with the upper end of the duct connecting to outwardly facing openings provided in a housing extending around the upper end of the duct. During use air can enter the windward side of the duct through respective openings, with stale air exiting from the building through respective openings on the leeward side of the duct.

According to a first aspect of the invention there is provided a lighting arrangement, the arrangement comprising a plurality of spaced elongate light emitting members, with a light source at one end of each of the light emitting members such that light travels along the length of the light emitting members and is emitted therefrom.

The light source may be in the form of one or more LEDs.

A reflector may be provided at the other end of each light emitting member. The reflector may be in the form of a piece of a highly light reflective material.

A light source may be provided at each end of the light emitting members.

A reflector may be provided at each end of the light emitting members.

The light sources may be solar powered, and the arrangement may include a photovoltaic unit. The arrangement may include a battery to store electricity produced by the photovoltaic unit, and the battery may be a lithium ion battery.

The light emitting members may be in the form of lengths of a translucent or substantially transparent material, which material may be a plastics material and may be acrylic.

The lengths of material may have a profiled cross section.

The lengths of material may have a minimum radial dimension of 1 cm.

A plurality of reflective and/or refractive elements may be provided in the light emitting members to reflect outwardly light travelling through the light emitting members.

The elements may be in the form of bubbles in the material of the light emitting members.

The elements may be in the form of pieces of a highly light reflective material within the material of the light emitting members.

The lighting arrangement may include a control arrangement with a light detector, the control arrangement being configured such that when darkness is detected the light sources are automatically actuated.

According to a second aspect of the invention there is provided a ventilation arrangement locatable on the roof of a building, the arrangement including a light arrangement according to any of the preceding thirteen paragraphs.

The light emitting members may be arranged to extend substantially vertically. The light emitting members may be spaced around the outside of the ventilation arrangement.

The ventilation arrangement may have a substantially rectangular configuration, and a light emitting member may be provided at each corner of the ventilation arrangement.

A solar panel or panels may be provided on an upper surface of the ventilation arrangement to provide power to the light sources.

The ventilation arrangement may be of a type with a duct extending therethrough and connecting to the interior of a building, with air entering the apparatus on a windward side thereof, and exiting the apparatus on a leeward side.

Embodiments of the present invention will now be described by way of example only and with reference to the accompanying drawings, in which.

Figure 1:
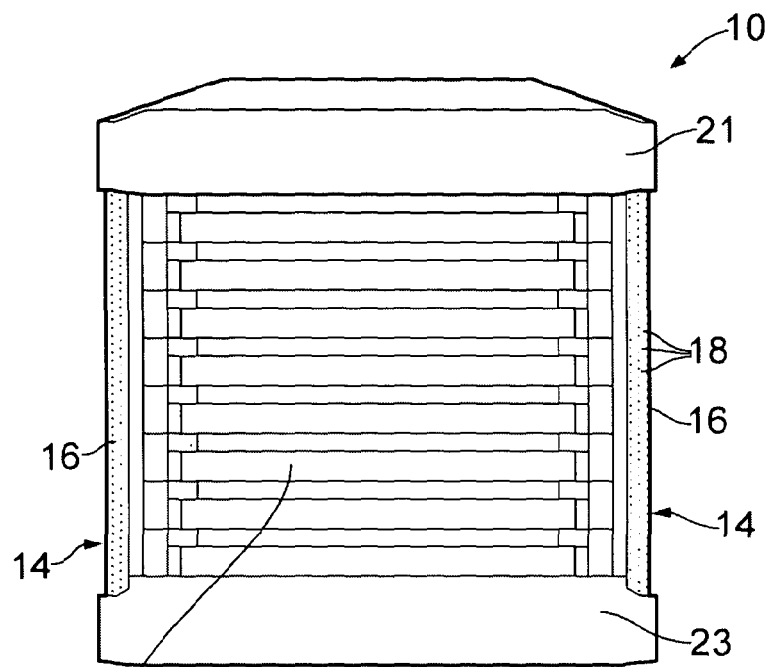
FIG. 1 is a side view of part of a first ventilation arrangement according to the invention.
Figure 2:
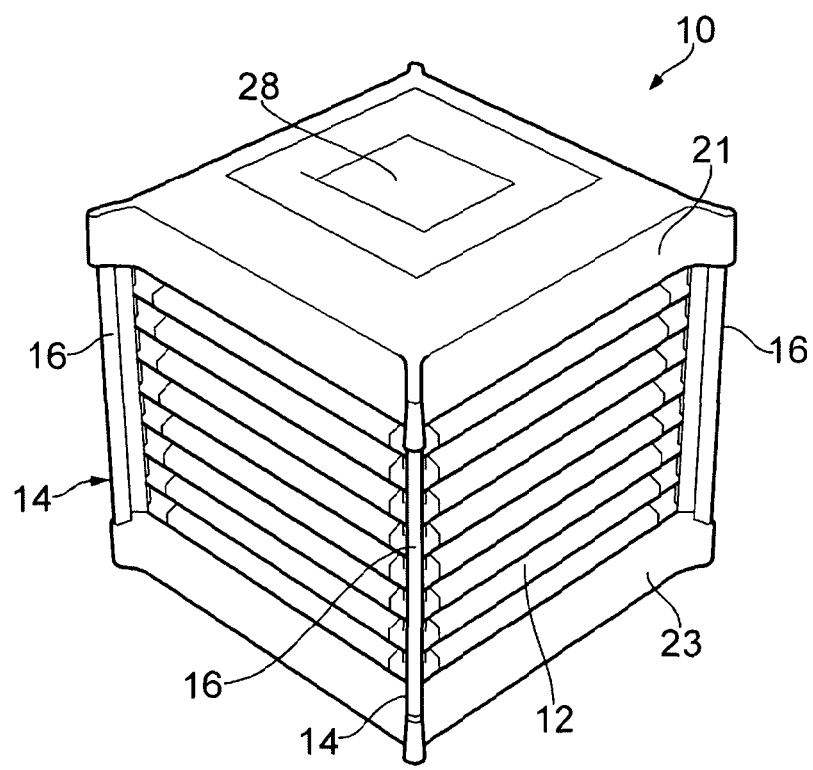
FIG. 2 is a perspective view from above of the apparatus of FIG. 1.
Figure 3:
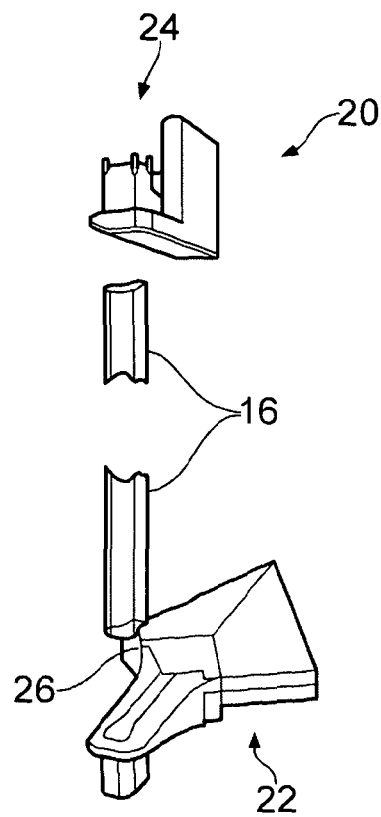
FIG. 3 is a diagrammatic exploded view of part of the apparatus of FIG. 1.

FIGS. 1 to 3 show a ventilation arrangement with a housing 10 locatable on the roof of a building to provide ventilation into and out of the building. A duct (not visible) extends downwardly from the housing 10 through the arrangement. The housing 10 has a generally square configuration with openings on each side of the square defined by respective louvre arrangements 12.

A lighting arrangement 14 is provided on each corner of the housing 10. Each lighting arrangement 14 comprises a light emitting member in the form of a profiled rod 16 of acrylic material, with a plurality of bubbles 18 provided throughout the length of the rod 16, which bubbles 18 are diagrammatically shown in FIG. 1.

FIG. 3 shows part of the lighting arrangement 14 in more detail with upper and lower mounting brackets 20, 22, which are located respectively in corner extensions from an upper cap part 21 and a base 23 of the housing. The brackets 20, 22 mount the rod 16 to extend vertically therebetween. The upper mounting bracket 20 also mounts a printed circuit board which holds a plurality of downwardly facing LEDs which point directly at an upper end of the rod 16. Each end of the rod 16 is highly polished to maximise light passing therethrough. Immediately beneath the lower end of the rod 16 a plate 26 is provided of a highly light reflecting material, such as may be used in light pipes. The rod 16 has a substantially tear drop shape cross section, diverging outwardly.

A photovoltaic solar panel 28 is mounted on top of the ventilation arrangement 10 to produce electricity from sunlight. The solar panel 28 is connected to a lithium ion battery (not shown) and to a control unit (also not shown). The control unit may have a light sensor to detect the ambient lighting conditions, and/or a voltage sensor for electricity produced by the solar panel 28.

In use, electricity is produced via the solar panel 28 and stored in the battery. When darkness is detected by the light sensor, perhaps by the reduced voltage produced by the solar panel 28, the lighting arrangement 14 is actuated. The LEDs on the printed circuit board 24 will be lit causing light to travel along the rods 16. The bubbles 18 will cause light to be transmitted outwardly from the rod 16. Light reaching the lower end of the rods 16 will be reflected back upwardly via the respective plates 26, giving the impression that the rod 16 is lit at both ends. The light produced by the LEDs can be any required colour, and if appropriate could change colour over time.

Figure 4:
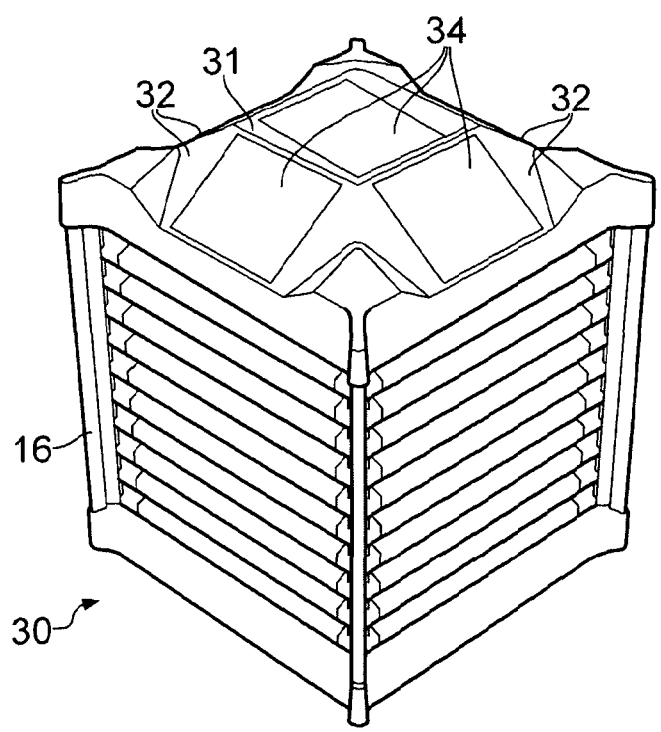
FIG. 4 is a similar view to FIG. 2 but of a second ventilation arrangement according to the invention.

FIG. 4 shows a similar ventilation arrangement with a housing 30, but in this instance an upper part of the arrangement 10 includes top face 31, with four sloping faces 32 extending downwardly therefrom, with each face 31, 32 mounting a respective solar panel 34, such that maximum solar energy is produced even at different positions of the sun relative to the housing 30.

The lighting arrangements 14 provided on the ventilation arrangement housings 10, 30 will provide soft architectural lighting to produce an enhanced visual aspect to the housings 10, 30 in darkness, without using an external power source.

Figure 5:
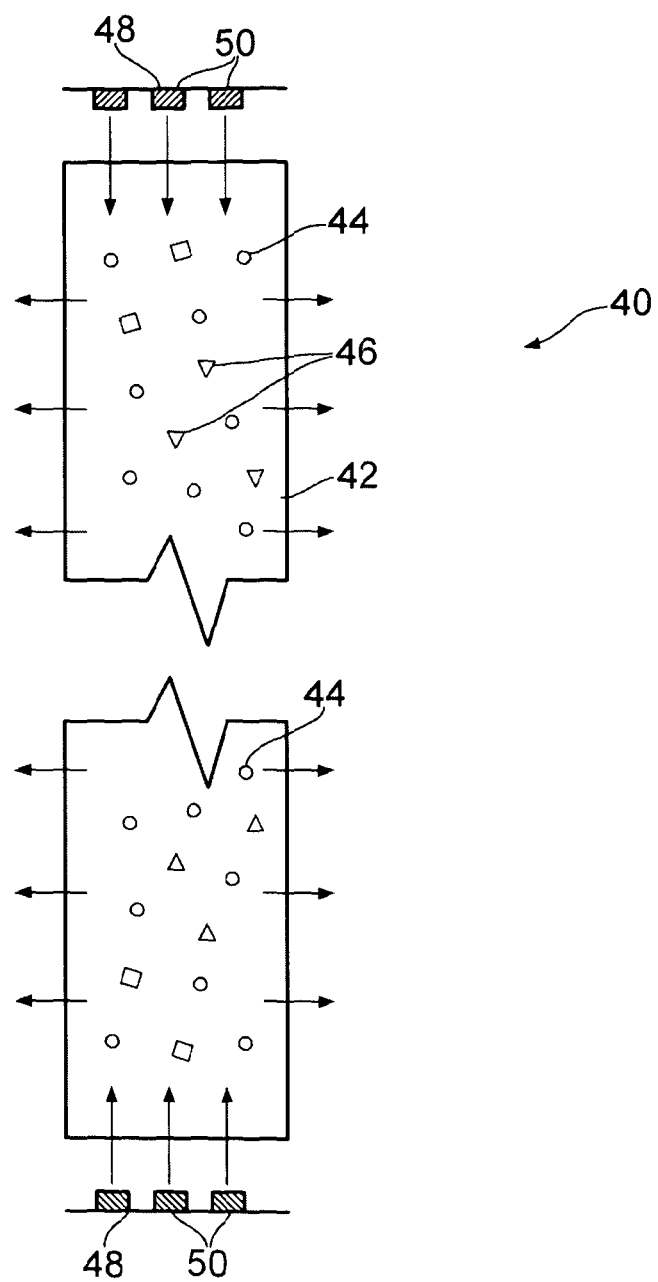
FIG. 5 is a diagrammatic side view of part of a lighting arrangement according to the invention.

FIG. 5 shows a lighting arrangement 40 suitable for use on ventilation arrangement housings 10, 30 as described above. The arrangement 40 comprises a bar 42 of a translucent or transparent light transmitting material. A plurality of reflective/refractive elements are provided within the bar 42. These elements may be in the form of bubbles 44 or flakes 46 of a highly light reflective material such as a metal foil.

A highly light reflective surface 48 is provided at each end of the bar 42. Mounted on each of the surfaces 48 are a plurality of solar powered LED's 50. Light shines from the LED's 50 along the length of the bar 42 and is reflected outwardly, and particularly when reflected or refracted from the bubbles 44 or flakes 46.

Various other modifications may be made without departing from the scope of the invention. For instance, whilst the rods have been made of acrylic due to its good weather and UV resistance, and also clarity, the rods may be made of different materials and may take a different form. A different system for automatically actuating the lighting arrangement could be used. The lighting arrangement could take a different form to a vertical rod at each corner, and particularly if the ventilating arrangement housing has a different form or shape.

Whilst endeavouring in the foregoing specification to draw attention to those features of the invention believed to be of particular importance it should be understood that the Applicant claims protection in respect of any patentable feature or combination of features hereinbefore referred to and/or shown in the drawings whether or not particular emphasis has been placed thereon.

The invention claimed is:

1. A ventilation arrangement locatable on the roof of a building, the ventilation arrangement having a substantially rectangular configuration, the arrangement including a plurality of spaced lighting arrangements, each of the lighting arrangements comprising an elongate light emitting member, with a light source at one end of the light emitting member such that light travels along the length of the light emitting member and is emitted therefrom, wherein a light emitting member is provided at each corner of the ventilation arrangement.

2. An arrangement according to claim 1, in which the light source is in the form of one or more LEDs.

3. An arrangement according to claim 1, in which a reflector is provided at the other end of each light emitting member, which reflector may be in the form of a piece of a highly light reflective material.

4. An arrangement according to claim 1, in which a light source is provided at each end of the light emitting members.

5. An arrangement according to claim 1, in which a reflector is provided at each end of the light emitting members.

6. An arrangement according to claim 1, in which the light sources are solar powered.

7. An arrangement according to claim 6, in which the arrangement includes a photovoltaic unit.

8. An arrangement according to claim 7, in which the arrangement includes a battery to store electricity produced by the photovoltaic unit.

9. An arrangement according to claim 1, in which the light emitting members are in the form of lengths of a translucent or substantially transparent material.

10. An arrangement according to claim 9, in which the substantially transparent material is acrylic.

11. An arrangement according to claim 9, in which the lengths of material have a profiled cross section.

12. An arrangement according to claim 9, in which the lengths of material have a minimum radial dimension of 1 cm.

13. An arrangement according to claim 9, in which a plurality of reflective and/or refractive elements are provided in the light emitting members to reflect outwardly light travelling through the light emitting members.

14. An arrangement according to claim 13, in which the elements are in the form of bubbles in the material of the light emitting members.

15. An arrangement according to claim 13, in which the elements are in the form of pieces of a highly light reflective material within the material of the light emitting members.

16. An arrangement according to claim 1, in which the lighting arrangement includes a control arrangement with a light detector, the control arrangement being configured such that when darkness is detected the light sources are automatically actuated.

17. An arrangement according to claim 1, in which the light emitting members are arranged to extend substantially vertically.

18. An arrangement according to claim 1, in which the light emitting members are spaced around the outside of the ventilation arrangement.

19. An arrangement according to claim 1, in which a solar panel or panels are provided on an upper surface of the ventilation arrangement to provide power to the light sources.

20. An arrangement according to claim 1, in which the ventilation arrangement is of a type with a duct extending therethrough and connecting to the interior of a building, with air entering the apparatus on a windward side thereof, and exiting the apparatus on a leeward side.

* * * * *